US010871988B1

(12) United States Patent
Gao et al.

(10) Patent No.: US 10,871,988 B1
(45) Date of Patent: Dec. 22, 2020

(54) METHODS FOR FEEDBACK-BASED OPTIMAL WORKLOAD SCHEDULING AND DEVICES THEREOF

(71) Applicant: JPMorgan Chase Bank, N.A., New York, NY (US)

(72) Inventors: Minlin Gao, Livingston, NJ (US); Jason K S Choy, Shorts Hills, NY (US); Darren Marvin, Poole (GB); Libin Yang, Princeton, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 161 days.

(21) Appl. No.: 15/816,820

(22) Filed: Nov. 17, 2017

Related U.S. Application Data

(60) Provisional application No. 62/430,979, filed on Dec. 7, 2016.

(51) Int. Cl.
*G06F 9/48* (2006.01)
*G06F 9/50* (2006.01)
*G06F 9/445* (2018.01)
*G06F 7/58* (2006.01)

(52) U.S. Cl.
CPC ............ *G06F 9/4881* (2013.01); *G06F 9/445* (2013.01); *G06F 9/48* (2013.01); *G06F 9/4806* (2013.01); *G06F 9/4843* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5038* (2013.01); *G06F 9/5044* (2013.01); *G06F 9/5055* (2013.01); *G06F 7/58* (2013.01)

(58) Field of Classification Search
CPC ........ G06F 9/48; G06F 9/4806; G06F 9/4843; G06F 9/4881; G06F 9/50; G06F 9/5005; G06F 9/5011; G06F 9/5016; G06F 9/5022; G06F 9/5027; G06F 9/5038; G06F 9/5044; G06F 9/5055
See application file for complete search history.

(56) References Cited

U.S. PATENT DOCUMENTS

| 8,555,281 B1 * | 10/2013 | van Dijk | G06F 9/4881 718/100 |
| 2004/0226013 A1 * | 11/2004 | Mariotti | G06F 11/008 718/100 |
| 2006/0241945 A1 * | 10/2006 | Morales | G10L 13/033 704/260 |
| 2009/0013175 A1 * | 1/2009 | Elliott | H04L 63/0428 713/154 |

(Continued)

*Primary Examiner* — Charles M Swift
(74) *Attorney, Agent, or Firm* — Greenblum & Bernstein, P.L.C.

(57) ABSTRACT

Methods, non-transitory computer readable media, and workload scheduler devices that determine one of a plurality of task categories for a received task. A stored expected runtime for each of a plurality of CPUs to execute one standard computation unit (SCU) in the determined one of the plurality of task category is obtained. One of the plurality of CPUs is selected based on the stored expected runtime. The task is dispatched to the selected one of the plurality of CPUs for execution. Accordingly, with this technology, tasks associated with workloads can be more effectively dispatched and more effectively processed by a CPU pool.

15 Claims, 5 Drawing Sheets

(56) References Cited

U.S. PATENT DOCUMENTS

| | | | | |
|---|---|---|---|---|
| 2009/0300633 | A1* | 12/2009 | Altrichter | G06F 9/4856 718/103 |
| 2010/0107166 | A1* | 4/2010 | Topaloglu | G06F 9/5094 718/102 |
| 2010/0115048 | A1* | 5/2010 | Scahill | H04L 67/322 709/213 |
| 2010/0293275 | A1* | 11/2010 | Rezaiifar | H04L 47/14 709/225 |
| 2011/0061057 | A1* | 3/2011 | Harris | G06F 9/5072 718/104 |
| 2011/0154348 | A1* | 6/2011 | Elnozahy | G06F 1/324 718/104 |
| 2012/0124591 | A1* | 5/2012 | Cadambi | G06F 9/505 718/103 |
| 2015/0293794 | A1* | 10/2015 | Levin | G06F 9/505 718/104 |
| 2015/0295854 | A1* | 10/2015 | Sun | G06F 9/4887 709/226 |
| 2016/0098292 | A1* | 4/2016 | Boutin | G06F 9/505 718/104 |
| 2018/0060122 | A1* | 3/2018 | Tang | G06F 9/4887 |

* cited by examiner

METHODS FOR FEEDBACK-BASED OPTIMAL WORKLOAD SCHEDULING AND DEVICES THEREOF

This application claims the benefit of U.S. Provisional Patent Application Ser. No. 62/430,979 filed Dec. 7, 2016, which is hereby incorporated by reference in its entirety.

FIELD

This technology generally relates to enterprise networks and, more particularly, to methods and devices for improved workload scheduling.

BACKGROUND

In a typical compute grid environment comprised of multiple servers from one or more data centers, multiple central processing unit (CPU) pools are used to process workloads from applications. A compute backbone (CBB) is a scalable cloud computing service delivering high performance computing through multiple CPUs. In a CBB, clients (e.g., application servers) may submit jobs or workloads for processing. The jobs contain task(s) which are the minimum unit of workload.

Generally, one CPU processes one task at a time and a job dispatcher dispatches tasks to the fastest of the CPUs. Many factors influence the speed at which a CPU can process a task. These factors include CPU model, memory, hard disk, network, and/or CPU age, for example. Typically, CPU model and available memory are utilized as indicators of speed. However, use of these indicators often yields inaccurate results.

In particular, in a virtual infrastructure environment, the CPU model only represents the hosting CPU and not the virtual machine (VM) as the VM may not access the full power of the CPU. Additionally, various submitted tasks may require attributes in addition to CPU power, such as, for example, access to a database. In this instance, the distance between the selected CPU and the database may impact the overall run time for the CPU to process a task. Accordingly, dispatching tasks for workloads without considering an increased number of factors is ineffective, resulting in reduced performance and processing efficiency.

SUMMARY

A method for improved task scheduling across central processing units (CPUs), implemented by one or more workload scheduler devices includes determining one of a plurality of task categories for a received task. A stored expected runtime for each of a plurality of CPUs to execute one standard computation unit (SCU) in the determined one of the plurality of task category is obtained. One of the plurality of CPUs is selected based on the stored expected runtime. The task is dispatched to the selected one of the plurality of CPUs for execution.

A workload scheduler device includes memory comprising programmed instructions stored thereon and one or more processors configured to be capable of executing the stored programmed instructions to determine one of a plurality of task categories for a received task. A stored expected runtime for each of a plurality of CPUs to execute one standard computation unit (SCU) in the determined one of the plurality of task category is obtained. One of the plurality of CPUs is selected based on the stored expected runtime. The task is dispatched to the selected one of the plurality of CPUs for execution.

A non-transitory computer readable medium having stored thereon instructions for proved task scheduling across CPUs includes executable code which when executed by one or more processors, causes the processors to determine one of a plurality of task categories for a received task. A stored expected runtime for each of a plurality of CPUs to execute one standard computation unit (SCU) in the determined one of the plurality of task category is obtained. One of the plurality of CPUs is selected based on the stored expected runtime. The task is dispatched to the selected one of the plurality of CPUs for execution.

This technology has a number of associated advantages including providing methods, non-transitory computer readable media, and workload scheduler devices that more effectively schedule workloads across a CPU pool. With this technology, workloads are scheduled based on particular characteristics of the tasks associated with workloads and the ability of the CPUs within the pool to perform the tasks. The scheduling policy is adaptive and can self-learn CPU performance for different task categories. Therefore, this technology advantageously optimizes a compute grid to utilize resources efficiently and to improve the speed with which workloads are processed.

DETAILED DESCRIPTION

Figure 1:
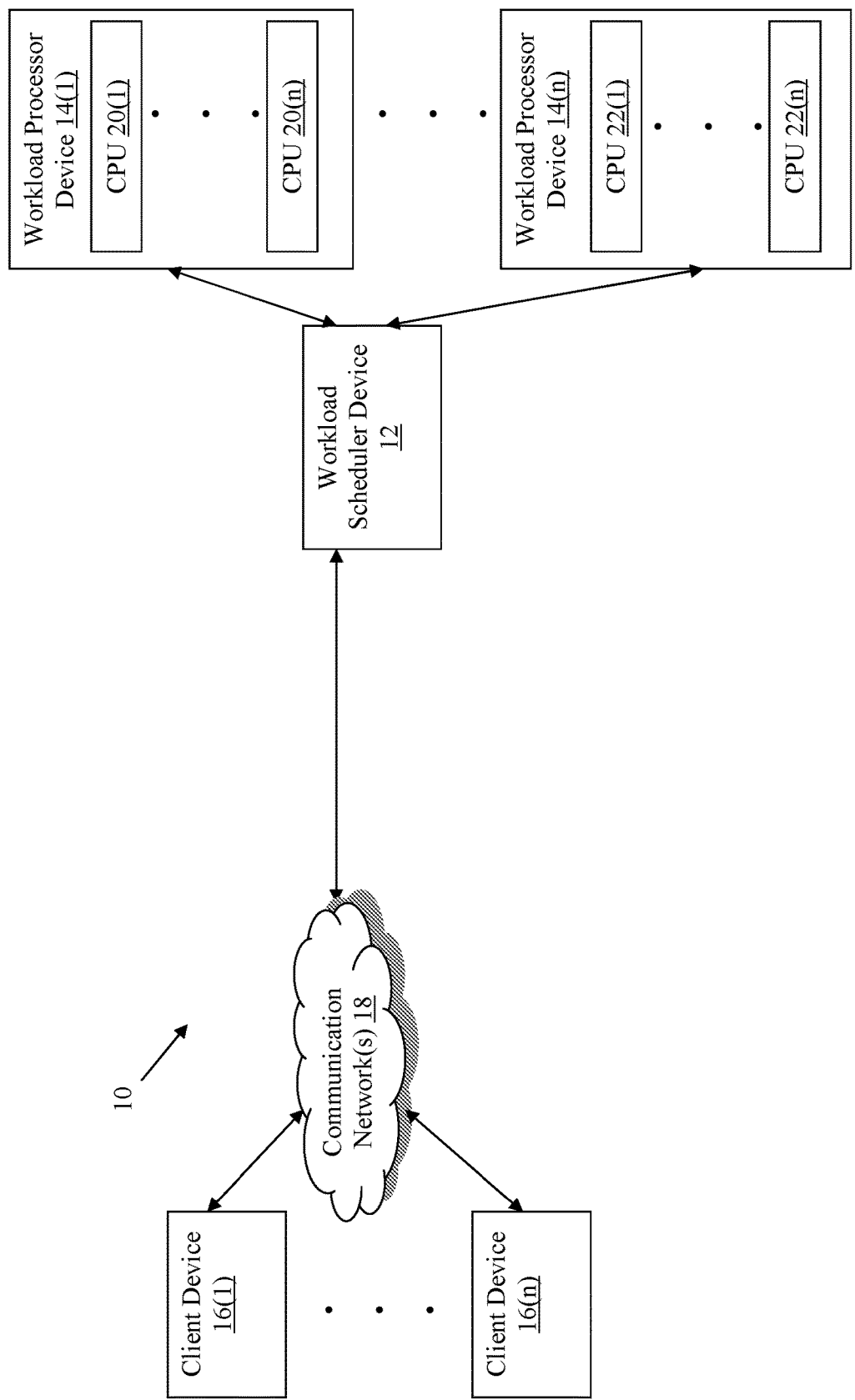
FIG. 1 is a block diagram of an exemplary network environment with an exemplary workload scheduler device.

Referring to FIG. 1, an exemplary network environment 10 with an exemplary workload scheduler device 12 is illustrated. The workload scheduler device 12 in this example is coupled to a plurality of workload processor devices 14(1)-14(n) and, via communication network(s) 18, client devices 16(1)-16(n), although the workload scheduler device 12, workload processor devices 14(1)-14(n), and/or client devices 16(1)-16(n), may be coupled together via other topologies. Each of the workload processor devices 14(1)-14(n) hosts a plurality of central processing units (CPUs) 20(1)-20(n) and 22(1)-22(n), which collectively comprise a CPU pool. This technology provides a number of advantages including methods, non-transitory computer readable media, and workload scheduler devices that more efficiently and effectively schedule workloads based on an analysis of tasks associated with the workloads and an adaptive determination of the ability of CPUs to process the tasks.

Figure 2:
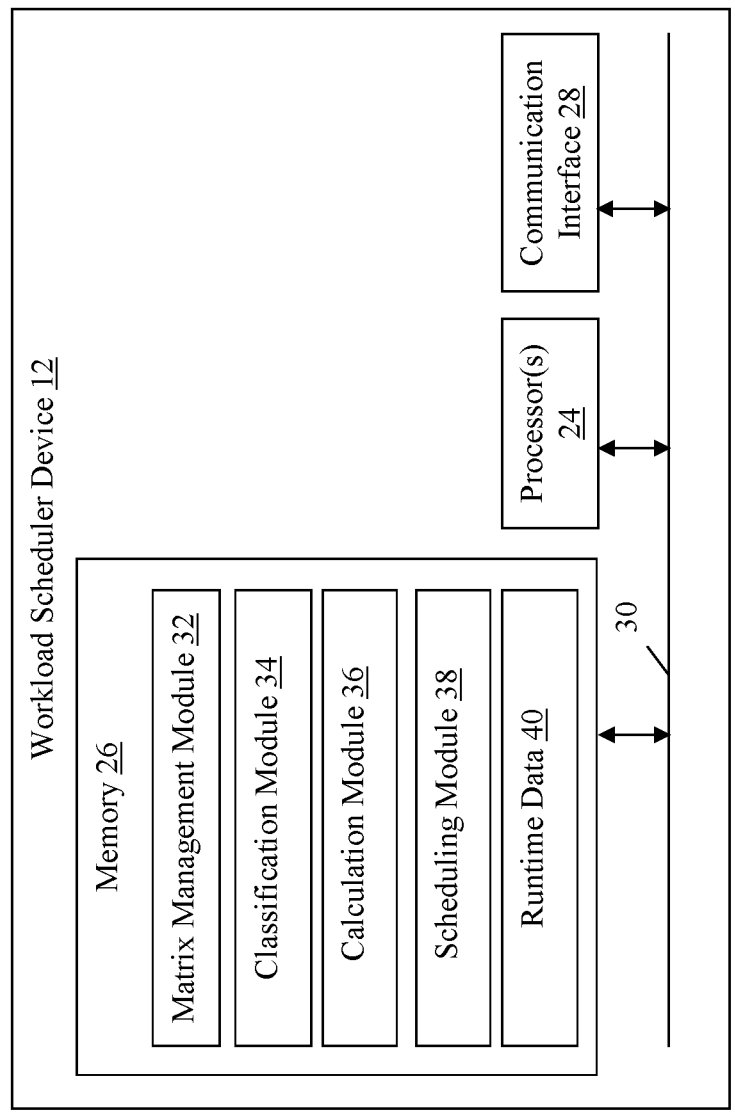
FIG. 2 is a block diagram of the exemplary workload scheduler device of FIG. 1.

Referring to FIGS. 1-2, the workload scheduler device 12 in this example includes one or more processors 24, a memory 26, and/or a communication interface 28, which are coupled together by a bus 30 or other communication link, although the workload scheduler device 12 can include other types and/or numbers of elements in other configurations.

The processor(s) 24 of the workload scheduler device 12 may execute programmed instructions stored in the memory 26 for the any number of the functions described and illustrated herein. The processor(s) 24 of the workload scheduler device 12 may include one or more CPUs or general purpose processors with one or more processing cores, for example, although other types of processor(s) can also be used.

The memory 26 of the workload scheduler device 12 stores these programmed instructions for one or more aspects of the present technology as described and illustrated herein, although some or all of the programmed instructions could be stored elsewhere. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s) 24, can be used for the memory 26.

Figure 3:
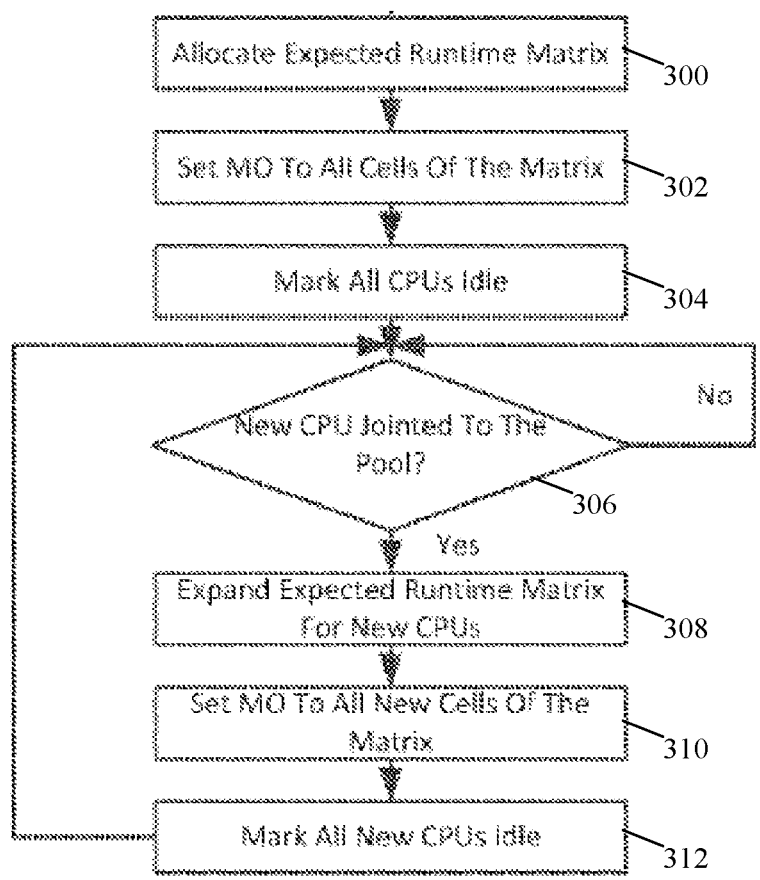
FIG. 3 is a flowchart of an exemplary method for initializing the exemplary workload scheduler device of FIG. 1.

Accordingly, the memory 26 of the workload scheduler device 12 can store one or more applications that can include executable instructions that, when executed by the workload scheduler device 12, cause the workload scheduler device 12 to perform actions, such as to transmit, receive, or otherwise process network messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the workload scheduler device 12 itself, may be located in virtual server(s) running in a cloud-based computing environment rather than being tied to one or more specific physical network computing devices. Also, the application(s) may be running in one or more virtual machines (VMs) executing on the configuration management server device 12.

In this particular example, the memory 26 of the workload scheduler device 12 includes a matrix management module 32, a classification module 34, a calculation module 36, a scheduling module 38, and runtime data 40, although the memory 22 can include other policies, modules, databases, or applications, for example. The runtime data 40 can be a table, database, or other data structure storing an expected runtime matrix and an idle CPU list, although other information can also be included in the runtime data.

The matrix management module 32 in this example initiates and updates the expected runtime matrix in the runtime data. The expected runtime matrix can include cells or entries as illustrated in Table 1:

As illustrated above, Table 1 includes an entry corresponding to an expected runtime for each of a plurality of categories of tasks and each of a plurality of CPUs, which correspond to CPUs 20(1)-20(n) and/or CPUs 22(1)-22(n). In this example, the matrix management module 32 has initialized all expected runtimes to a default value M0, which can be set to zero or to one or more other values larger than zero, for example.

As described and illustrated herein, subsequent to initialization, the matrix management module 32 will update the expected runtime matrix to include an expected runtime for one or more of the CPUs 20(1)-20(n) and/or CPUs 22(1)-22(n) for processing one standard computation unit (SCU) for each of the task categories. In one example, for an ExpectedRuntime(T, CPUx, Cy), T represents the time, CPUx is the identifier of a specific one of the CPUs 20(1)-20(n) and/or CPUs 22(1)-22(n), and Cy is the name of a specific one of the task categories.

The classification module 34 in this example classifies tasks into categories based on the nature or characteristics of the tasks. For example, C1 may be used to designate tasks that are CPU intensive and are from batch workloads. C2 may be utilized for tasks that are I/O intensive and are from interactive workloads. C3 may be utilized for blended tasks. Accordingly, tasks in the same category should have similar profiles to one another. Other task designations and types or categories can be used in other examples.

The calculation module 36 calculates an expected runtime for processing one SCU for each task category for each of the CPUs 20(1)-20(n) and/or CPUs 22(1)-22(n) in the system. Each task within a category contains a predetermined number of SCUs. For example, if the task category is Monte Carlo Simulation, one SCU may be defined as one Monte Carlo path. Thus, for a task with one Monte Carlo path, the number of SCUs is equal to one. For a task with five Monte Carlo paths, the number of SCUs is equal to five.

In some examples, the client devices 16(1)-16(n) submit workloads with an indication of a number of SCUs per submitted task to the workload scheduler device 12 and, in other examples, the workload scheduler device 12 can determine the number of SCUs from a received workload. Periodically, the calculation module 32 recalculates and updates the expected runtime for processing one SCU in each of the pre-defined task categories, which can be used by the matrix management module 32 to update the expected runtime matrix, as described and illustrated in more detail later.

The scheduling module 38 can dispatch tasks to one of the CPUs 20(1)-20(n) and/or CPUs 22(1)-22(n) based on the expected runtime matrix as well as update the idle CPU list in the runtime data upon task dispatch and/or completion. The scheduling module 38 updates the expected runtime matrix at runtime based on the performance by the CPUs 20(1)-20(n) and/or CPUs 22(1)-22(n) of tasks in the different categories. The scheduling module 38 further utilizes the

TABLE 1

|        | Category (0) | Category (1) | Category (2) | Category (3) | Category (4) | ... | Category (m) |
|--------|--------------|--------------|--------------|--------------|--------------|-----|--------------|
| CPU(0) | M0 | M0 | M0 | M0 | M0 | M0 | M0 |
| CPU(1) | M0 | M0 | M0 | M0 | M0 | M0 | M0 |
| CPU(2) | M0 | M0 | M0 | M0 | M0 | M0 | M0 |
| CPU(3) | M0 | M0 | M0 | M0 | M0 | M0 | M0 |
| ...    | M0 | M0 | M0 | M0 | M0 | M0 | M0 |
| CPU(n) | M0 | M0 | M0 | M0 | M0 | M0 | M0 | expected runtime matrix to dispatch tasks to one of the CPUs 20(1)-20(*n*) and/or CPUs 22(1)-22(*n*).

In one example, a task is submitted from task category Cy with TaskSCU and is completed in TaskRunTime seconds, the following Formula (1) can be used to calculate the expected runtime (ExpectedRuntime(T+1, CPUx, Cy)) for inclusion in the expected runtime matrix:

ExpectedRuntime(*T*+1,CPU*x*,*Cy*)=ExpectedRuntime
(*T*,CPU*x*,*Cy*)+(Rate*(TaskRunTime/TaskSCU−
ExpectedRuntime(*T*,CPU*x*,*Cy*)))   Formula (1):

In the above formula (TaskRunTime/TaskSCU) is the runtime for one SCU and (TaskRunTime/TaskSCU−ExpectedRuntime(T, CPUx, Cy)) is the runtime difference between the current expected runtime and the last task runtime. The Rate represents a desired adjustment pace for the expected runtime. The value of the Rate is between 0 and 1.0 in this example, although other values can be used for the Rate in other example. A value of 1.0 indicates that last task runtime represents the performance of one of the CPUs 20(1)-20(*n*) and/or CPUs 22(1)-22(*n*). This parameter can be tuned for different compute grid environments.

Accordingly, for optimal scheduling of a task associated with an obtained workload, the scheduling module 38 evaluates the expected runtimes in the expected runtime matrix in the runtime data 40 for a corresponding task category, which indicates the performance of one or more of the CPUs 20(1)-20(*n*) and/or CPUs 22(1)-22(*n*) for the particular task category. A smaller expected runtime value represents better performance for a task associated with the particular task category. One of the CPUs 20(1)-20(*n*) and/or CPUs 22(1)-22(*n*) having a smallest expected runtime value will be preferred and selected for processing the tasks associated with the workload.

The scheduling module 38 can also utilize a discovery feature to account for changing performance of one or more of the CPUs 20(1)-20(*n*) and/or CPUs 22(1)-22(*n*) over time. Relatively slow ones of the CPUs 20(1)-20(*n*) and/or CPUs 22(1)-22(*n*) for a particular task category may become faster over time. To discover these ones of the CPUs 20(1)-20(*n*) and/or CPUs 22(1)-22(*n*), the workload schedule device may select one of the CPUs 20(1)-20(*n*) and/or CPUs 22(1)-22(*n*) other than one of the CPUs 20(1)-20(*n*) and/or CPUs 22(1)-22(*n*) with the shortest expected runtime for a particular task, as indicated in the expected runtime matrix.

The workload scheduler device 12 can implement the discovery feature by injecting a randomness factor into selection of one of the CPUs 20(1)-20(*n*) and/or CPUs 22(1)-22(*n*) for dispatch of a task. To inject randomness, the scheduling module 38 may select a randomness parameter g for a given task category, wherein the value of g is between zero and one in this example, although other values can be used in other examples.

During task dispatch, the scheduling module 38 generates a random number G between zero and one. If the random number G is greater than g, then the scheduling module 38 will randomly select one of the CPUs 20(1)-20(*n*) and/or CPUs 22(1)-22(*n*) from the idle CPU list in the runtime data 40. If the random number is less than or equal to g, then one of the CPUs 20(1)-20(*n*) and/or CPUs 22(1)-22(*n*) having a shortest expected runtime, as indicated in the expected runtime matrix in the runtime data 40, will be selected. Thus, if the randomness parameter g is set to 1, the discovery feature is disabled and the scheduling module 38 will always select one of the CPUs 20(1)-20(*n*) and/or CPUs 22(1)-22(*n*) with shortest expected runtime. If g is set to zero, the selection of one of the CPUs 20(1)-20(*n*) and/or CPUs 22(1)-22(*n*) becomes random and the feedback-based optimal job scheduling policy is effectively disabled.

The communication interface 28 of the workload scheduler device 12 operatively couples and communicates between the workload scheduler device 12, the workload processor devices 14(1)-14(*n*), and/or the client devices 16(1)-16(*n*), which are all coupled together by the communication network(s) 18 and/or direct connections, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The workload scheduler device 12 can be a standalone device or integrated with one or more other devices or apparatuses. In one particular example, the workload scheduler device 12 can include or be hosted by one of the workload processor devices 14(1)-14(*n*), and other arrangements are also possible. Moreover, one or more of the devices of the workload scheduler device 12 can be in a same or a different communication network including one or more public, private, or cloud networks, for example.

The workload processor devices 14(1)-14(*n*) in this example are any type of computing device capable of hosting the CPUs 20(1)-20(*n*) and/or CPUs 22(1)-22(*n*). Accordingly, each of the workload processor devices 14(1)-14(*n*) includes one or more of the CPUs 20(1)-20(*n*) and/or CPUs 22(1)-22(*n*), memory, and a communication interface, which are coupled together by a bus or other communication link, although other numbers and/or types of network devices could be used.

The workload processor devices 14(1)-14(*n*) are configured to receive tasks dispatched from the workload schedule device 12, process the tasks, and return a result. The tasks can originate with the client devices 16(1)-16(*n*), such as from applications hosted on the client devices 16(1)-16(*n*), for example, although the tasks can also originate elsewhere in the network environment 10 in other examples. Accordingly, together, the workload scheduler device 12 and workload processing devices 14(1)-14(*n*) comprise a workload dispatch and execution system or apparatus operating to support the client devices 16(1)-16(*n*) with respect to computational requirements.

The client devices 16(1)-16(*n*) in this example include any type of computing device that can host applications (e.g., application servers) that issue workloads to the workload scheduler device 12 for processing by the workload processing devices 14(1)-14(*n*). Each of the client devices 16(1)-16(*n*) in this example includes a processor, a memory, and a communication interface, which are coupled together by a bus or other communication link, although other numbers and/or types of network devices could be used.

Although the exemplary network environment 10 with the workload scheduler device 12, workload processor devices 14(1)-14(*n*), client devices 16(1)-16(*n*), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the workload scheduler device 12, workload processor devices 14(1)-14(n), or client devices 16(1)-16(n), for example, may be configured to operate as virtual instances on the same physical machine. In other words, one or more of the workload scheduler device 12, workload processor devices 14(1)-14(n), or client devices 16(1)-16(n) may operate on the same physical device rather than as separate devices communicating through communication network(s) 18. Additionally, there may be more or fewer workload scheduler devices, workload processor devices, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of improved task scheduling across the CPUs 20(1)-20(n) and/or CPUs 22(1)-22(n) will now be described with reference to FIGS. 1-6. Referring more specifically to FIG. 3, an exemplary method for initializing the workload scheduler device 12 and constructing the expected runtime matrix is illustrated. In step 300 in this example, the workload scheduler device 12 allocates the expected runtime matrix within the memory 26, such as by inserting the expected runtime matrix into the runtime data 40.

In step 302, the workload scheduler device 12 sets all cells to M0. M0 is a default value in this example, which can be zero or greater than zero and indicates that an expected runtime has not yet been determined for a particular one of the CPUs 20(1)-20(n) and/or CPUs 22(1)-22(n) and a particular task category.

In step 304, the workload scheduler device 12 marks all CPUs as idle. In this example, the workload scheduler device 12 can maintain an idle CPU list within the runtime data 40 in the memory 26. The idle CPU list includes an indication of ones of the CPUs 20(1)-20(n) and/or CPUs 22(1)-22(n) that are idle and not currently processing any tasks or busy and are currently processing a task.

In step 306, the workload scheduler device 12 monitors for the addition of one of the CPUs 20(1)-20(n) and/or CPUs 22(1)-22(n). If the workload schedule determines that one of the CPUs 20(1)-20(n) and/or CPUs 22(1)-22(n) has not joined a CPU pool spread across the workload processor devices 14(1)-14(n) in this example, then the No branch is taken back to step 306 and the workload scheduler device 12 effectively waits for a new one of the CPUs 20(1)-20(n) and/or CPUs 22(1)-22(n) to be added. However, if the workload scheduler device 12 determines that a new one of the CPUs 20(1)-20(n) and/or CPUs 22(1)-22(n) has been added, then the Yes branch is taken to step 308.

In step 308, the workload scheduler device 12 expands the expected runtime matrix to reflect the new one of the CPUs 20(1)-20(n) and/or CPUs 22(1)-22(n). The expansion of the expected runtime matrix can include adding an additional row for the new one of the CPUs 20(1)-20(n) and/or CPUs 22(1)-22(n), for example.

In step 310, the workload scheduler device 12 sets all new cells or entries of the matrix to a default value (e.g., M0). Accordingly, when a new one of the CPUs 20(1)-20(n) and/or CPUs 22(1)-22(n) is added, the workload scheduler device 12 expands the expected runtime matrix for the new one of the CPUs 20(1)-20(n) and/or CPUs 22(1)-22(n) to include a new row and inserts a default value in each cell of the row for each of a plurality of task categories corresponding to the columns of the expected runtime matrix.

In step 312, the workload scheduler device marks the new one of the CPUs 20(1)-20(n) and/or CPUs 22(1)-22(n) as idle in the idle CPU list in the runtime data 40. Subsequent to marking the new one of the CPUs 20(1)-20(n) and/or CPUs 22(1)-22(n) as idle, the workload scheduler device 12 continues the monitoring process in step 306 in order to ensure an accurate matrix reflecting inclusion of all idle ones of the CPUs 20(1)-20(n) and/or CPUs 22(1)-22(n).

Figure 4:
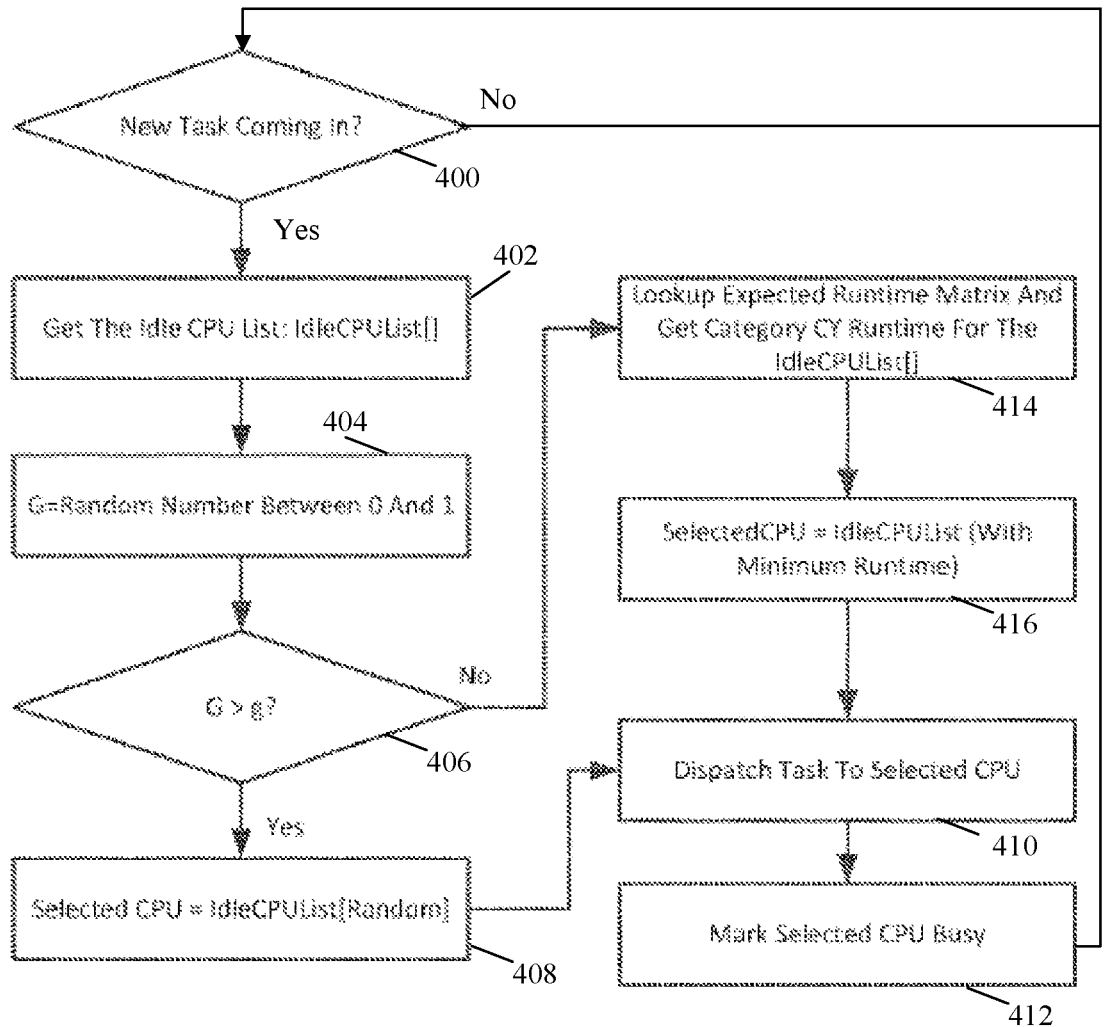
FIG. 4 is a flowchart of an exemplary method for scheduling tasks.

Referring more specifically to FIG. 4, an exemplary method for CPU selection including use of a discovery feature and updating an idle CPU list is illustrated. The discovery feature assumes that the randomness parameter g has been set to a value between zero and one in this example. The randomness parameter g can be stored in the memory 24 and can be configurable by an administrator, for example, in order to establish the level of random selection and CPU performance discovery.

In step 400, the workload scheduler device 12 determines whether a new task is received from one of the client devices 16(1)-16(n) (e.g., as part of a workload). If the workload scheduler device 12 determines that a new task has not been received, then the No branch is taken back to step 400 and the workload scheduler device 12 effectively waits for a new task to be received. However, if the workload scheduler device 12 determines that a new task has been received from one of the client device 16(1)-16(n), then the Yes branch is taken to step 402.

In step 402, the workload scheduler device 12 retrieves the idle CPU list from the runtime data 40 in order to identify those of the CPUs 20(1)-20(n) and/or CPUs 22(1)-22(n) that are currently idle and available to process the received task.

In step 404, the workload scheduler device 12 optionally generates a random number G, which in this example is between 0 and 1, although other values can be generates in other examples.

In step 406, the workload scheduler device 12 determines whether the generated random number G is greater than the stored randomness parameter g, although a less than or other mathematical comparison can also be used in other examples. If the workload scheduler device 12 determines that the generated random G is greater than the stored randomness parameter g, then the Yes branch is taken to step 408.

In step 408, the workload scheduler device 12 randomly selects one of the CPUs 20(1)-20(n) and/or CPUs 22(1)-22(n) included in the idle CPU list retrieved in step 402.

In step 410, the workload scheduler device 12 dispatches the task to the selected one of the CPUs 20(1)-20(n) and/or CPUs 22(1)-22(n) hosted by one of the workload processor devices 14(1)-14(n). The selected one of the CPUs 20(1)-20(n) and/or CPUs 22(1)-22(n) will then process the task and optional return a result of the processing.

In step 412, the workload scheduler device 12 marks the selected one of the CPUs 20(1)-20(n) and/or CPUs 22(1)-22(n) as busy. The marking can be maintained in the idle CPU list for example by removing an indication of the selected one of the CPUs 20(1)-20(n) and/or CPUs 22(1)-22(n) from the idle CPU list or including an indication, correlated with the selected one of the CPUs 20(1)-20(n) and/or CPUs 22(1)-22(n), that the selected one of the CPUs 20(1)-20(n) and/or CPUs 22(1)-22(n) is no longer idle, although other methods of maintaining whether one of the CPUs 20(1)-20(n) and/or CPUs 22(1)-22(n) is idle or busy can also be used in other examples. Subsequent to marking the selected one of the CPUs 20(1)-20(n) and/or CPUs 22(1)-22(n) as busy, the workload scheduler 12 proceeds back to step 400 in this example.

Referring back to step 406, if the workload scheduler determines that the generated random number G is not greater than the stored randomness parameter g, then the No branch is taken to step 414. In step 414, the workload scheduler device 12 determines a task category Cy of the task received in step 400. The category can be determined based on characteristics and/or an analysis of an associated workload or can be explicitly included in a request by the one of the client devices 16(1)-16(n) from which the task was received. The workload scheduler device 12 then retrieves the expected runtime from the expected runtime matrix for the task category for each of the CPUs 20(1)-20(n) and/or CPUs 22(1)-22(n) identified on the idle CPU list obtained in step 402

In step 416, the workload scheduler device 12 selects an idle one of the CPUs 20(1)-20(n) and/or CPUs 22(1)-22(n) for which the corresponding retrieved expected runtime for the task category was shortest. In other words, one of the CPUs 20(1)-20(n) and/or CPUs 22(1)-22(n) is selected that is currently idle and that is most likely to process a task in the task category associated with the task received in step 400 in the shortest amount of time. Subsequent to selecting the one of the CPUs 20(1)-20(n) and/or CPUs 22(1)-22(n), the workload scheduler device 12 proceeds to step 410, as described and illustrated in more detail earlier. In other examples, steps 406 and 408 are not performed and one or more of steps 402-412 can be performed in parallel for any number of received tasks.

Figure 5:
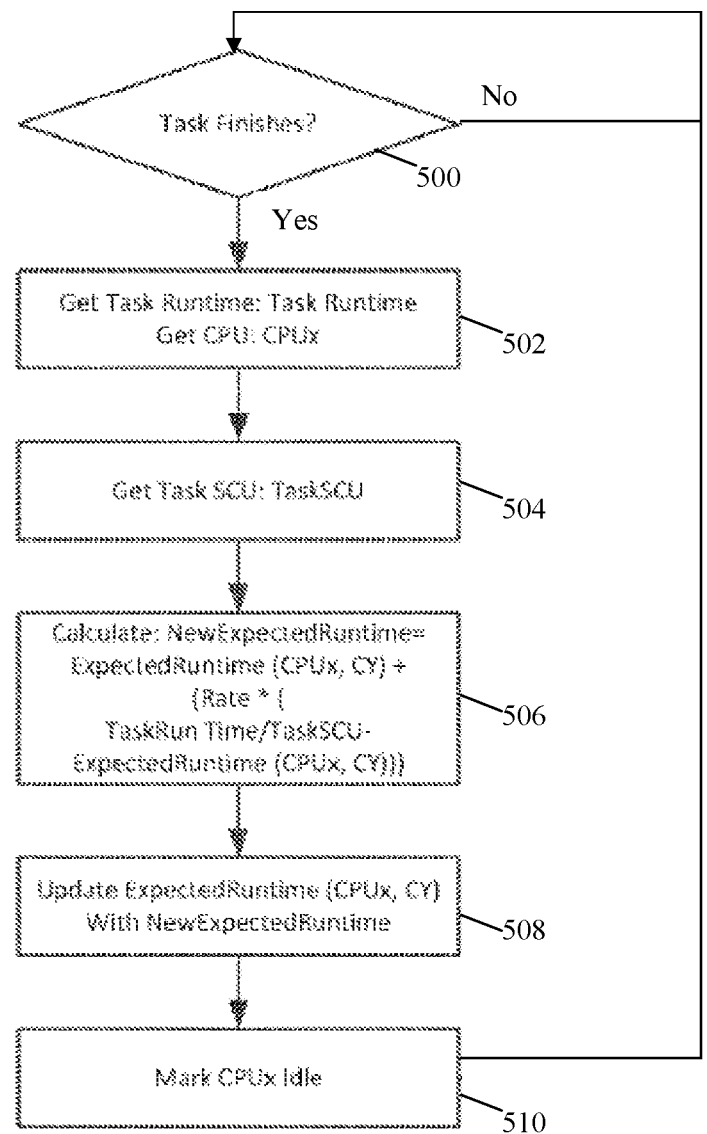
FIG. 5 is a flowchart of an exemplary method for maintaining a stored runtime matrix to facilitate feedback and improved workload scheduling.

Referring more specifically to FIG. 5, an exemplary method for updating an expected runtime matrix and idle CPU list is illustrated. In step 500, the workload scheduler device 12 determines whether a task has completed. The task could have been dispatched to one of the CPUs 20(1)-20(n) and/or CPUs 22(1)-22(n) as described and illustrated in more detail earlier with reference to step 410 of FIG. 4, for example.

The determination regarding whether the task has finished can be based on an indication returned from one of the workload processor devices 14(1)-14(n), for example, although other methods for determining whether a task has completed can also be used. If the workload scheduler device 12 determines in step 500 that a task has not completed, then the No branch is taken back to step 500 and the workload scheduler device effectively waits for a task to complete. However, if the workload schedule device 12 determines that a task has completed, then the Yes branch is taken to step 502.

In step 502, the workload scheduler device 12 determines the actual runtime for the task. The actual runtime can be determined based on stored timestamps associated with the completed task or an indication in a response returned from one of the workload processor devices 14(1)-14(n), for example, although other methods for determining the actual runtime for the completed task can also be used.

In step 504, the workload scheduler device 12 determines the SCU for the task. The SCU for the task can be determined based on an analysis of characteristics of the task or can be provided from a requesting one of the client devices 16(1)-16(n) for example. In the example described and illustrated earlier, the number of SCUs for a task with five Monte Carlo paths would be five when one SCU for a Monte Carlo simulation workload is established to be one Monte Carlo path. Other types of workloads and types and/or number of SCUs can also be used in other examples.

In step 506, the workload scheduler device 12 generates a new expected runtime for the task category for a selected one of the CPUs 20(1)-20(n) and/or CPUs 22(1)-22(n) that processed the completed task. The new expected runtime can be generated as described and illustrated in more detail earlier with reference to Formula (1), for example, although other methods of generating the new expected runtime can also be used in other examples.

In step 508, the workload scheduler device 12 updated the expected runtime matrix to reflect the new expected runtime for the task category for the selected one of the CPUs 20(1)-20(n) and/or CPUs 22(1)-22(n) that processed the completed task. Accordingly, in an unconventional approach, the workload scheduler device 12 advantageously uses feedback regarding actual runtime to inform subsequent CPU selection instead of static parameters (e.g., CPU model).

In step 510, the workload scheduler device 12 marks the one of the CPUs 20(1)-20(n) and/or CPUs 22(1)-22(n) that processed the completed task as being idle. The marking can be entered into the idle CPU list in the runtime data 40, for example. The one of the CPUs 20(1)-20(n) and/or CPUs 22(1)-22(n) that processed the completed task can be identified based on an indication stored at the time the task was dispatched or an indication included in a returned result of the processing of the task, for example, although other methods for identifying the one of the CPUs 20(1)-20(n) and/or CPUs 22(1)-22(n) that processed the completed task can also be used in other examples.

Subsequent to marking the one of the CPUs 20(1)-20(n) and/or CPUs 22(1)-22(n) that processed the completed task as being idle, the workload schedule device 12 proceeds back to step 500 and again waits to determine that a task has been completed, as described and illustrated in more detail earlier. In other examples, one or more of steps 502-510 can be performed in parallel for any number of tasks.

With this technology, workload can be more effectively scheduled and associated tasks can be more efficiently processed. This technology facilitates an adaptive selection of CPUs for processing tasks based on empirical runtime determinations and task categories to allow CPU selection to change over time to reflect those CPUs most likely to process tasks in the shortest amount of time. Accordingly, this technology results in improved functionality of workload scheduler devices and more efficient utilization of resources including CPUs.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved task scheduling across central processing units (CPUs) implemented by one or more workload scheduling devices, comprising:
   determining one of a plurality of task categories for a received task;
   obtaining a stored expected runtime for each of a plurality of CPUs to execute one standard computation unit (SCU) in the determined one of the plurality of task categories;
   selecting one of the plurality of CPUs based on the stored expected runtime; and
   dispatching the task to the selected one of the plurality of CPUs for execution,
   wherein the expected runtime for each of the plurality of CPUs is stored in a matrix and the method further comprises inserting a default expected runtime in a plurality of entries of the matrix in order to initialize the matrix, each of the entries of the matrix corresponding to another one of the plurality of task categories and another one of the plurality of CPUs, and
   wherein the plurality of task categories includes at least one from among a first task category that includes CPU-intensive tasks from batch workloads, a second task category that includes input/output-intensive tasks from interactive workloads, a third task category that includes blended tasks, and a fourth task category that includes Monte Carlo simulation tasks.

2. The method of claim 1, further comprising:
   identifying a subset of the CPUs marked as idle;
   obtaining the stored expected runtime for each of the subset of the plurality of CPUs, wherein the one of the plurality of CPUs is selected from the subset of the plurality of CPUs;
   marking the selected one of the plurality of CPUs as busy subsequent to dispatching the task to the selected one of the plurality of CPUs;
   determining when the task has completed; and
   marking the selected one of the plurality of CPUs as idle, when the determining indicates that the task has completed.

3. The method of claim 1, further comprising:
   determining an actual runtime subsequent to the execution of the task; and
   updating the stored expected runtime for the selected one of the plurality of CPUs to process the one SCU in the determined one of the plurality of task categories based on the determined actual runtime.

4. The method of claim 1, wherein the selected on of the plurality of CPUs has a shortest expected runtime.

5. The method of claim 1, further comprising:
   receiving another task;
   generating a random number;
   comparing the random number to a stored randomness parameter that is configurable by an administrator in order to establish a level of random selection and CPU performance discovery;
   selecting another one of the plurality of CPUs from among a randomly determined CPU and a CPU having a shortest expected runtime based on the comparison; and
   dispatching the another task to the selected another one of the plurality of CPUs.

6. A workload scheduler device, comprising memory comprising programmed instructions stored thereon and one or more processors configured to be capable of executing the stored programmed instructions to:
   determine one of a plurality of task categories for a received task;
   obtain a stored expected runtime for each of a plurality of CPUs to execute one standard computation unit (SCU) in the determined one of the plurality of task categories;
   select one of the plurality of CPUs based on the stored expected runtime; and
   dispatch the task to the selected one of the plurality of CPUs for execution,
   wherein the expected runtime for each of the plurality of CPUs is stored in a matrix and the one or more processors are further configured to be capable of executing the stored programmed instructions to insert a default expected runtime in a plurality of entries of the matrix in order to initialize the matrix, each of the entries of the matrix corresponding to another one of the plurality of task categories and another one of the plurality of CPUs, and
   wherein the plurality of task categories includes at least one from among a first task category that includes CPU-intensive tasks from batch workloads, a second task category that includes input/output-intensive tasks from interactive workloads, a third task category that includes blended tasks, and a fourth task category that includes Monte Carlo simulation tasks.

7. The workload scheduler device of claim 6, wherein the one or more processors are further configured to be capable of executing the stored programmed instructions to:
   identify a subset of the CPUs marked as idle;
   obtain the stored expected runtime for each of the subset of the plurality of CPUs, wherein the one of the plurality of CPUs is selected from the subset of the plurality of CPUs;
   mark the selected one of the plurality of CPUs as busy subsequent to dispatching the task to the selected one of the plurality of CPUs;
   determine when the task has completed; and
   mark the selected one of the plurality of CPUs as idle, when the determining indicates that the task has completed.

8. The workload scheduler device of claim 6, wherein the one or more processors are further configured to be capable of executing the stored programmed instructions to:
   determine an actual runtime subsequent to the execution of the task; and
   update the stored expected runtime for the selected one of the plurality of CPUs to process the one SCU in the determined one of the plurality of task categories based on the determined actual runtime.

9. The workload scheduler device of claim 6, wherein the selected on of the plurality of CPUs has a shortest expected runtime.

10. The workload scheduler device of claim 6, wherein the one or more processors are further configured to be capable of executing the stored programmed instructions to:
receive another task;
generate a random number;
compare the random number to a stored randomness parameter that is configurable by an administrator in order to establish a level of random selection and CPU performance discovery;
select another one of the plurality of CPUs from among a randomly determined CPU and a CPU having a shortest expected runtime based on the comparison; and
dispatch the another task to the selected another one of the plurality of CPUs.

11. A non-transitory machine readable medium having stored thereon instructions for improved task scheduling across central processing units (CPUs) comprising executable code which when executed by one or more processors, causes the one or more processors to:
determine one of a plurality of task categories for a received task;
obtain a stored expected runtime for each of a plurality of CPUs to execute one standard computation unit (SCU) in the determined one of the plurality of task categories;
select one of the plurality of CPUs based on the stored expected runtime; and
dispatch the task to the selected one of the plurality of CPUs for execution,
wherein the expected runtime for each of the plurality of CPUs is stored in a matrix and the executable code when executed by the processors further causes the one or more processors to insert a default expected runtime in a plurality of entries of the matrix in order to initialize the matrix, each of the entries of the matrix corresponding to another one of the plurality of task categories and another one of the plurality of CPUs, and
wherein the plurality of task categories includes at least one from among a first task category that includes CPU-intensive tasks from batch workloads, a second task category that includes input/output-intensive tasks from interactive workloads, a third task category that includes blended tasks, and a fourth task category that includes Monte Carlo simulation tasks.

12. The non-transitory machine readable medium of claim 11, wherein the executable code when executed by the processors further causes the one or more processors to:
identify a subset of the CPUs marked as idle;
obtain the stored expected runtime for each of the subset of the plurality of CPUs, wherein the one of the plurality of CPUs is selected from the subset of the plurality of CPUs;
mark the selected one of the plurality of CPUs as busy subsequent to dispatching the task to the selected one of the plurality of CPUs;
determine when the task has completed; and
mark the selected one of the plurality of CPUs as idle, when the determining indicates that the task has completed.

13. The non-transitory machine readable medium of claim 11, wherein the executable code when executed by the processors further causes the one or more processors to:
determine an actual runtime subsequent to the execution of the task; and
update the stored expected runtime for the selected one of the plurality of CPUs to process the one SCU in the determined one of the plurality of task categories based on the determined actual runtime.

14. The non-transitory machine readable medium of claim 11, wherein the selected on of the plurality of CPUs has a shortest expected runtime.

15. The non-transitory machine readable medium of claim 11, wherein the executable code when executed by the processors further causes the one or more processors to:
receive another task;
generate a random number;
compare the random number to a stored randomness parameter that is configurable by an administrator in order to establish a level of random selection and CPU performance discovery;
select another one of the plurality of CPUs from among a randomly determined CPU and a CPU having a shortest expected runtime based on the comparison; and
dispatch the another task to the selected another one of the plurality of CPUs.

* * * * *